United States Patent [19]

Brand

[11] 4,357,170

[45] Nov. 2, 1982

[54] TITANIUM DIOXIDE PIGMENT TREATED TO SUPPRESS YELLOWING IN POLYMERS

[75] Inventor: John R. Brand, Palmerton, Pa.

[73] Assignee: The New Jersey Zinc Company, Bethlehem, Pa.

[21] Appl. No.: 288,650

[22] Filed: Jul. 30, 1981

[51] Int. Cl.$^3$ ............................................... C09C 1/36
[52] U.S. Cl. ........................... 106/300; 106/308 N; 523/200; 523/216; 523/217; 524/497
[58] Field of Search .................. 106/300, 308 N; 260/42.16; 523/200, 216, 217; 524/497

[56] References Cited

U.S. PATENT DOCUMENTS

| | | | |
|---|---|---|---|
| 3,345,187 | 10/1967 | Binnis | 106/300 |
| 3,380,927 | 4/1968 | Edelstein et al. | 252/308 |
| 3,498,946 | 3/1970 | Calkins | 260/37 |
| 3,545,994 | 12/1970 | Lott et al. | 106/308 B |
| 3,673,146 | 6/1973 | Factor | 260/37 PC |
| 3,713,859 | 1/1973 | Hoover et al. | 106/308 N |
| 3,729,440 | 4/1973 | Liberty | 260/45.7 P |
| 3,904,565 | 9/1975 | Yoshiura et al. | 260/23 H |
| 4,001,034 | 1/1977 | Simkin | 106/300 |
| 4,050,951 | 9/1977 | Piccolo et al. | 106/300 |
| 4,054,552 | 10/1977 | Hoogeboom | 260/18 PF |
| 4,209,430 | 6/1980 | Weber | 106/300 |

FOREIGN PATENT DOCUMENTS 1347571  2/1974  United Kingdom ........... 260/45.7 P

*Primary Examiner*—James Poer
*Attorney, Agent, or Firm*—Vincent J. Vasta, Jr.

[57] ABSTRACT

A titanium dioxide pigment is provided for use in polymeric compositions comprising a pyrogenic titanium dioxide pigment which has been treated with an addition system comprising:

(a) an organophosphate/alkanolamine addition product, and
(b) a polyol.

This invention provides for a novel method for treating a pyrogenic titanium dioxide pigment in order to reduce yellowing when such pigment is incorporated into a polymeric composition comprising adding to such pigment an addition system which comprises:

(a) an organophosphate/alkanolamine addition product, and
(b) a polyol.

22 Claims, No Drawings

TITANIUM DIOXIDE PIGMENT TREATED TO SUPPRESS YELLOWING IN POLYMERS

BACKGROUND OF THE INVENTION

Various titanium dioxide pigments in the rutile form are used as whiteners in a variety of polymeric compositions. In some such polymeric compositions, most notably polystyrene containing compositions, a chemical reaction takes place between the titanium dioxide pigment and the polymer itself which often results in the formation of undesirable compounds which impart a yellow coloration to the end product. A similar chemical reaction can take place between the titanium dioxide pigment and additives, such as phenolic antioxidants, which are used in a variety of polymers, such as polysytrene and polyethylene.

The art has recognized that the presence of anatase or hydrous titania components in the titanium dioxide pigment utilized as the whitener for a specific polymeric composition is the cause of the yellowing which often takes place.

It has also been recognized that the yellowing which takes place can be controlled by the precipitation of hydrous oxides of elements such as aluminum, silicon and zirconium upon the surface of the titanium dioxide pigment. Such treatment processes invariably involve the slurrying of the titanium dioxide pigment in water followed by filtration, drying and micronization operations in order to produce a usable titanium dioxide pigment having enhanced properties. This method of treating titanium dioxide pigments in order to control undesirable yellowing when incorporated into various polymeric compositions has the distinct disadvantage of adding a significant expense to the production of such pigments.

As an alternative, the treatment of titanium dioxide pigments with zinc stearate has been commercially employed in order to counteract the undesirable yellowing effect referred to above. However, due to the fact that zinc stearate in insoluble in most solvents deemed appropriate for the treatment of titanium dioxide pigments, this solid material is normally dry-blended with the titanium dioxide pigment, which results in an admixed end product having less than the optimum degree of coverage of the pigment by the zinc stearate treating agent, and in which some classification of the dissimilar solids occurs.

It has thus been found desirable to develop a new treatment method which avoids the disadvantages of the art employed methods described above, while affording the advantages of substantially improving control of the yellowing phenomena frequently encountered, and at the same time reducing the overall cost of producing such a treated product.

Exemplary of the state of the art as to various known treatment methods for titanium dioxide pigments are the following:

U.S. Pat. No. 3,345,187 which issued on Oct. 3, 1967 to Binnis, discloses the use of trialkanolamine phosphates, benzoates and titanates in combination, as well as trialkanolamine alone, to coat titanium dioxide pigments in order to produce corrosion resistant coatings. No mention is made of any benefits to be afforded by any such treatment relevant to color stability when such a treated pigment may be employed in a polymeric composition.

U.S. Pat. No. 3,545,994 which issued on Dec. 8, 1980 to Bott, et al. discusses the need for masking active surface sites on titanium dioxide pigments and discloses the use of homogeneous precipitation of hydrous oxides on titanium dioxide pigments in order to provide such a masking affect. This methodology is an example of a much more expensive way of accomplishing the result which is produced in accordance with the present invention at considerably less cost.

U.S. Pat. No. 4,001,034 which issued on Jan. 4, 1977 to Simkin, discloses a method of applying a coating containing titanium dioxide and a zinc phosphinate polymer to the surface of metals. This method is not directed to a treatment of titanium dioxide to reduce yellowing when incorporated in polymers.

A number of patents have issued directed to the use of phosphorus-containing organics as stabilizers for polycarbonates. Among them are the following:

U.S. Pat. No. 3,498,946 which issued on Mar. 3, 1970, directed to the use of organic phosphites;

U.S. Pat. No. 3,673,146 which issued on June 27, 1972, directed to triorganophosphite;

U.S. Pat. No. 3,729,440 which issued on Apr. 24, 1973, directed to alkyl aryl phosphinites;

U.S. Pat. No. 4,054,522 which issued on Oct. 18, 1977, directed to ester of phosphorodihalous acid;

British Pat. No. 1,347,571 which issued on Apr. 19, 1971, directed to alkyl aryl phosphonites.

None of these references are directly related to the treatment process or the product produced thereby of the present invention.

U.S. Pat. No. 3,713,859 which issued on Jan. 30, 1973 to Hoover, et al. discloses the use of amino-diphosphonates as pigment dispersants. No suggestion of any suppression of chemical reactivity of titanium dioxide pigments in order to reduce yellowing when incorporated in polymeric compositions is found in this teaching.

U.S. Pat. No. 3,904,565 which issued on Sept. 9, 1975 to Yoshiura discloses the use of a mixture of thiobisphenol, an organic phosphite, a fatty acid salt and a polyalkyleneglycol ether in order to improve the antioxidation and lightfastness characteristics of polyolefins.

U.S. Pat. No. 4,209,430 which issued on June 24, 1980 to Weber discloses the treatment of titanium dioxide pigment with a phosphorylated polyolefin in order to inhibit phenolic yellowing in polyethylene which presents a method that is basically different from the present application, which does not utilize a treatment material produced via the phosphorylation of a polyolefin.

None of the foregoing prior art teaching suggest either the method or the product which is the subject of the present application, which involves the treatment of pyrogenic titanium dioxide pigment in order to reduce the yellowing effect which might otherwise take place when such a pigment is incorporated into a variety of polymeric compositions.

It is, therefore, an object of the present invention to provide a method for the treatment of a pyrogenic titanium dioxide pigment in order to substantially reduce the yellowing effect which might otherwise take place when such pigments are incorporated into various polymeric compositions.

It is a further object of the present invention to provide a product comprising a pyrogenic titanium dioxide pigment which has been treated in order to reduce the yellowing effect which might otherwise take place when such product is incorporated in various polymeric compositions.

These and other objects of the invention will become more apparent from the following description of the invention.

SUMMARY OF THE INVENTION

In accordance with the present invention a titanium dioxide pigment is provided for use in polymeric compositions comprising a pyrogenic titanium dioxide pigment which has been treated with an addition system comprising:
 (a) an organophosphate/alkanolamine addition product, and
 (b) a polyol.

This invention provides for a novel method for treating a pyrogenic titanium dioxide pigment in order to reduce yellowing when such pigment is incorporated into a polymeric composition comprising adding to such pigment an addition system which comprises:
 (a) an organophosphate/alkanolamine addition product, and
 (b) a polyol.

DESCRIPTION OF THE INVENTION

It has been found that the treatment of a pyrogenic titanium dioxide pigment with an addition system comprising
 (a) an organophosphate/alkanolamine addition product, and
 (b) a polyol,
serves to significantly reduce the color tone characteristic, which is an indication of the degree of yellowness resulting when such a pigment is used as an additive in various polymeric compositions.

The treated titanium dioxide pigment product which is the subject of the present invention may be treated with the treatment system disclosed in the dry form, in which the treatment reagents are applied as a spray or are otherwise mixed well with the dry pigment by other methods such as the addition to the "intensifier bar" in a V-blender, or by dropping the reagents into a screw conveyor or paddle mixer containing the pigment. This provides a more thorough and stable distribution of the treatment on the pigment than the dry blending of solids mentioned previously. The expense of wet finishing may thereby be avoided and an economic advantage achieved.

The treatment method of the present invention has been found to be effective even for titanium dioxide pigments which contain higher than average amounts of anatase and hydrous titania so that the operating conditions for the burner in the furnace producing the pyrogenic titanium dioxide need not be optimized to minimize the formation of such reactive anatase and hydrous species. This results in an additional economic advantage since the optimization of the burner operation is usually accomplished by reducing the output of a burner which normally results in increased unit cost for the pigment produced.

It has also been found that even when burner operating conditions have been optimized the best of pigments produced under such optimized conditions without additional treatment will yield inferior color tones as compared with similar pigment treated in accordance with the method of the present invention.

The product which is the subject of the present invention is a pyrogenic titanium dioxide pigment which normally possesses an average fundamental particle size in the range of from about 1300 to 2400 A° as measured by a light scattering technique. Such pigments may be produced via various commercially known processes which will be familiar to those skilled in the art.

Subsequent to the production of the pyrogenic titanium dioxide pigments which form the basis of the products of the present invention, the pigment is normally heated to a temperature of from about 250° to 500° C. in an air-swept rotary kiln in order to remove residues of chlorine which may remain from the manufacturing operation. The pigments are then subjected to the two-part treatment of the present invention consisting of the application of from about 0.01 to about 1.0 weight percent of each of the organophosphate/alkanolamine addition product and the polyol components.

The organophosphate utilized can be the product of the reaction of phosphorus pentoxide with an alcohol group, and can be the coester of alkyl or aryl alcohols or ethoxides. One such material is disclosed in the U.S. Pat. No. 3,380,927 assigned to Dexter Chemical Corporation, the teachings of which are incorporated herein by reference. In its preferred form, the acid anhydride will be neutralized to a pH of 8 to 10 with ammonia, an alkali metal hydroxide or any of a number of organic amines; especially alkanolamines such as dimethylethanolamine, methyldiethanolamine, methylethanolamine, diethylethanolamine, ethyldiethanolamine, diisopropylaminoethanol, butyldiethanolamine, dibutylaminoethanol, dimethylamino-2-propanol, diethylaminoethoxyethanol, propylaminoethanol, propyldiethanolamine, t-butylaminoethanol, monoethanolamine, diethanolamine, triethanolamine, aminoethylethanolamine, and the like, to form the organophosphate/alkanolamine addition product. The phosphate ester addition product can be sprayed onto the pigment in a mixing device, such as a ribbon blender, or by any other conventional means as will be well known to those skilled in the art, the choice of a specific means will depend upon the amount of material to be processed and the level of treatment desired.

A polyol component, such as trimethylolethane, trimethylolpropane and pentaerythritol, among others, is then applied, preferably as a spray after dissolution in an appropriate solvent.

The resultant product can optionally be milled by a means such as micronization, ring-roller milling and the like; however, milling is not necessary in order to realize the benefits of the treatment method of the present invention.

It has been found that one may achieve significant improvement in the color tone characteristic while maintaining the normal level of brightening achieved by a given amount of titanium dioxide pigment in various polymeric components by treating the pyrogenic titanium dioxide pigment utilized with from about 0.01 to about 1.0 weight percent of each of the organophosphate/alkanolamine addition product and the polyol component in the separate consecutive operations described above. However, the order of addition of these reagents is not critical.

Preferentially from about 0.1 to about 1.0 weight percent and most preferably from about 0.4 to about 0.6 weight percent of each of the aforementioned components may be utilized in order to achieve the desired degree of improvement in the color tone characteristics of the resultant polymeric product after incorporation of the treated titanium dioxide pigment.

The nature of the present invention may be more clearly understood by recourse to the following examples, which are set forth for illustrative purposes only and are not to be construed as limiting the invention thereto.

EXAMPLES

General Comments

In determining the effectiveness of the treatment method of the present invention in reducing the color tone of various polymeric compositions, tests were conducted to determine the brightness and the color tone of the various test samples investigated. The basic test procedures employed were as follows:

Color in White Polystyrene: With a Haake Rheocord set for a jacket temperature of 190° C. and a speed of 30 rpm, 30 grams of polystyrene are added to the mixing chamber and allowed to warm up. After 45 seconds, 1.2 grams of titanium dioxide pigment are added directly to the polystyrene as it is mixing. After 75 seconds, an additional 30 grams of polystyrene are added and forced in with the ram and attached weight. This mixture is mixed for 15 minutes, at which time the temperature is reduced to 130° C. Mixing continues until 30 minutes have elapsed. At that time the blades are stopped and the sample is removed, cut into small pieces and placed between two sheets of metal which are then placed between the platens of a Wabash press. The Wabash press has been heated to 425° F. The sample is preheated for two minutes while pressure is gradually applied until the sample softens and spreads. After the preheating period, full pressure of 35 tons is applied for 2 minutes and the sample is then cooled under pressure. Brightness (L) and color tone (a and b) measurements are made using the HUNTERLAB Color Difference Meter.

Polyethylene Yellowing: A procedure like that described by Weber in U.S. Pat. No. 4,209,430 can be used. However, each titanium dioxide pigment is milled with and without a phenolic antioxidant and the two portions are pressed side by side to make one plaque. Brightness (L) and color tone (b) values are recorded for each pigment with and without the antioxidant, and the $\Delta b$ value denotes the color change upon addition of antioxidant to the mix containing the pigment. Smaller values of $\Delta b$ are better, as are higher brightness (L) values and less-yellow (smaller) b values for the pigment tested with the antioxidant.

The adduct of the organophosphate acid anhydride with an alkanolamide can be prepared by adding the alkanolamine to the acid anhydride in a stirred vessel until the desired pH of 8 to 10 has been obtained. It may be necessary to add water to provide a mixture that can be sprayed. For example, the addition of 9 grams of dimethylethanolamine (DMEA) and 4 grams of water to 10 grams of Strodex P-100 organc phosphate gives a stable, sprayable mixture having a pH of 9.9.

The polyol is usually dissolved in water before application. Trimethylolethane for instance, is usually applied as a 50% solution in water.

The pyrogenic titanium dioxide pigment has preferably been treated in an air-swept rotary kiln at a temperature of 250° to 500° C., then cooled before the addition of surface-treatment reagents. In a typical laboratory treatment, one pound of the pigment is placed in a small plastic drum which is mounted at an angle of about 25 degrees from horizontal and rotated at about 50 rpm. If the reagents are to be added at the 0.5% level, based upon the pigment weight, 2.27 grams of the P-100/DMEA adduct is weighed into an atomizer bottle and all of it is sprayed onto the pigment over a period of 5 to 15 seconds. This procedure is repeated with 4.54 grams of a 50% aqueous solution of trimethylolethane (TME). The drum is then allowed to continue to rotate for five minutes to allow for thorough mixing.

EXAMPLES I-V

In order to illustrate the benefits of the treatment method of the present invention a number of samples of a pyrogenic titanium dioxide pigment, that had been heated to about 300° C. in an air-swept rotary kiln and which contained 97.5% $TiO_2$, 0.24% acid-soluble $TiO_2$, 1.5% $Al_2O_3$ and 0.6% $SiO_2$, were prepared and treated in accordance with the above procedures. Brightness and color tone determinations were made with regard to each of the tested samples. The data are summarized in Table I.

TABLE I
EXAMPLES I-V

| | | Color in White Polystyrene | |
|---|---|---|---|
| Example # | Treatment | Brightness, L | Color tone, b[c] |
| I | None | 87.1 | +3.9 |
| II | 0.5% P-100/DMEA[a] | 88.9 | 2.9 |
| III | 0.4% TME[b] | 90.0 | 1.2 |
| IV | 0.5% P-100/DMEA, 0.4% TME | 91.2 | 0.6 |
| V | 2.0% zinc stearate | 90.2 | 1.1 |

[a]Adduct of Strodex (U.S. Pat. No. 3,380,092) P-100 organophosphoric acid anhydride and dimethylethanolamine (DMEA)
[b]trimethylolethane
[c]More positive is more yellow

EXAMPLES VI-IX

To illustrate the use of other phosphorus-containing organic acid anhydrides in the adduct, four samples of the pyrogenic titanium dioxide used in Example I were prepared and treated using the above procedure. Brightness and color tone determinations were made for each sample, with the results given in Table 2.

TABLE 2
EXAMPLES VI-IX

| | | Color in White Polystyrene | |
|---|---|---|---|
| Example # | Treatment | Brightness, L | Color Tone, b |
| VI | .5% STRODEX MO-100[a]/DMEA, .5% TME | 91.0 | 0.1 |
| VII | .5% STRODEX SE-100[b]/DMEA, .5% TME | 90.8 | −0.4 |
| VIII | .5% STRODEX P-100[c]/DMEA, .5% TME | 91.0 | 0.0 |
| IX | .5% $H_3PO_4$/DMEA, .5% TME | 90.5 | 0.8 |
| Con- | None | 87.0 | 3.2 |

TABLE 2-continued

EXAMPLES VI-IX

| Example # | Treatment | Color in White Polystyrene | |
|---|---|---|---|
| | | Brightness, L | Color Tone, b |
| trol | | | |

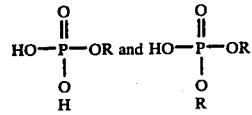

$^a$STRODEX MO-100 (Dexter Chemical Corp., Bronx, NY) is a mixture of

HO—P(=O)(OR)(OH) and HO—P(=O)(OR)(OR)

where R is a branched, saturated alkyl group.

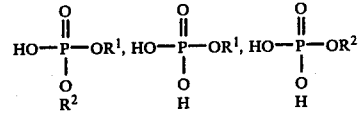

$^b$STRODEX SE-100 is a mixture of coesters:

HO—P(=O)(OR$^1$)(OR$^2$), HO—P(=O)(OR$^1$)(OH), HO—P(=O)(OR$^2$)(OH)

Where R$^1$ and R$^2$ are different branched alkyl ethoxylate groups.

The organophosphate adducts of Examples VI–VIII all provided better brightness and color tone than the orthophosphate adduct of Example IX.

EXAMPLES X–XII

To illustrate the use of other alkanolamines in the organophosphate adduct, three samples of the pyrogenic titanium dioxide used in Example I were prepared and treated using the above procedure. Brightness and color tone data are given in Table 3 for each sample.

TABLE 3

EXAMPLES X–XII

| Example # | Treatment | Color in White Polystyrene | |
|---|---|---|---|
| | | Brightness, L | Color tone, b |
| X | .5% P-100/DMEA,$^a$ .5% TME | 91.4 | 0.4 |
| XI | .5% P-100/DEEA,$^b$ .5% TME | 91.0 | −0.3 |
| XII | .5% P-100/AEEA,$^c$ .5% TME | 90.1 | 1.6 |
| Control | None | 89.1 | 3.0 |

$^a$dimethylethanolamine
$^b$diethylethanolamine
$^c$aminoethylethanolamine

EXAMPLES XIII–XV

The pigment of Example I was also used to make three samples to illustrate the benefit of using polyols other than trimethylolethane. Brightness and color data are given in Table 4.

TABLE 4

EXAMPLES XIII to XV

| Example # | Treatment | Color in White Polystyrene | |
|---|---|---|---|
| | | Brightness, L | Color Tone, b |
| XIII | .5% P-100/DMEA, .5% TME | 90.4 | 0.06 |
| XIV | .5% P-100/DMEA, .5% TMP$^a$ | 91.1 | 0.5 |
| XV | .5% P-100/DMEA, .5% PET$^b$ | 90.5 | 0.03 |
| Control | None | 88.0 | 3.9 |

$^a$Trimethylolpropane
$^b$Pentaerythritol

The data show that all of the polyols were effective in improving brightness and color tone.

EXAMPLES XVI–XXV

Ten samples of the pigment of Example I were treated with varying levels of the organophosphate/alkanolamine adduct and polyol to illustrate the effect on color in white polystyrene. The results are given in Table 5.

TABLE 5

EXAMPLES XVI–XXV

| Example # | % P-100/DMEA | % TME | Color in White Polystyrene | |
|---|---|---|---|---|
| | | | Brightness, L | Color Tone, b |
| XVI | 0 | 1.0 | 90.6 | 1.1 |
| XVII | 1.0 | 0 | 90.6 | 2.6 |
| XVIII | 0.2 | 0.2 | 90.8 | 1.9 |
| XIX | 0.2 | 0.8 | 91.2 | 0.8 |
| XX | 0.8 | 0.2 | 91.1 | 1.5 |
| XXI | 0.4 | 0.4 | 91.5 | 1.4 |
| XXII | 0.6 | 0.6 | 91.3 | 0.6 |
| XXIII | 1.0 | 1.0 | 91.3 | 0.5 |
| Control | 0 | 0 | 89.3 | 4.6 |
| XXIV | .01 | .01 | 87.8 | 2.8 |
| XXV | 0.4 | 0.6 | 90.4 | 0.1 |
| Control | 0 | 0 | 88.0 | 3.9 |

The data illustrate that as little as 0.01% of each reagent reduces the yellow color tone of the polymer.

EXAMPLES XXVI–XXVII

To illustrate the beneficial effect of the preferred treatment system in polymers other than polystyrene, the pigment of Example VIII was tested in white polyethylene formulated with two different phenolic antioxidants. Brightness and color tone data for polyethylene containing Santowhite (Monsanto trademark) phenolic antioxidant are given in Table 6 while data for polyethylene containing Santonox (Monsanto trademark) are summarized in Table 7.

TABLE 6

EXAMPLE XXVI COLOR IN POLYETHYLENE WITH SANTOWHITE ANTIOXIDANT

| Example # | Treatment | Color in White Polyethylene | | | |
|---|---|---|---|---|---|
| | | Brightness | | Color Tone | |
| | | L* | ΔL | b* | Δb |
| XXVI | .5% P-100/DMEA, .5% TME | 97.1 | −0.1 | 1.2 | 0.6 |
| Control | None | 96.1 | −1.0 | 3.4 | 2.6 |

*Brightness and color tone of polymer containing antioxidant

TABLE 7

EXAMPLE XXXII COLOR IN POLYETHYLENE WITH SANTONOX ANTIOXIDANT

| Example # | Treatment | Color in White Polyethylene | | | |
|---|---|---|---|---|---|
| | | Brightness | | Color Tone | |
| | | L* | ΔL | b* | Δb |
| XXVII | .5% P-100/DMEA, .5% TME | 97.0 | −0.3 | 1.8 | 1.3 |
| Control | None | 95.2 | −2.0 | 4.5 | 3.7 |

*Brightness and color tone of polymer containing antioxidant

EXAMPLE XXVIII

The beneficial effect of the preferred treatment system in yet a third polymer, polypropylene, again using the pigment of Example VIII, is illustrated by the data provided in Table 8.

TABLE 8

EXAMPLE XXVIII
COLOR IN POLYPROPYLENE
WITH SANTOWHITE ANTIOXIDANT

| Example # | | Color in White Polypropylene | | | |
|---|---|---|---|---|---|
| | | Brightness | | Color Tone | |
| | | L* | ΔL | b* | Δb |
| XXVIII | .5% P-100/DMEA, .5% TME | 96.2 | 0 | 3.1 | 0.2 |
| Control | None | 94.8 | −0.1 | 4.1 | 0.2 |

*Brightness and color tone of polymer containing antioxidant

In all of Examples XXVI–XXVIII, the preferred treatment provided higher brightness and less-yellow color tone when the pigment was incorporated into the polymer.

While the invention has been described with reference to a number of embodiments, it will be apparent to one skilled in the art that there are additional numerous variations which properly fall within the range of this invention. Therefore, it should be understood that the foregoing embodiments and examples are set forth to illustrate the advantages which may be achieved utilizing the present invention and should not be interpreted as limiting the scope of the invention.

I claim:

1. A titanium dioxide pigment for use in polymeric compositions comprising a pyrogenic titanium dioxide pigment which has been treated with an addition system comprising:
   (a) an organophosphate/alkanolamine addition product, and
   (b) a polyol.

2. A method for treating a pyrogenic titanium dioxide pigment to reduce yellowing when such pigment is incorporated into a polymeric composition comprising adding to such pigment an addition system which comprises:
   (a) an organophosphate/alkanolamine addition product, and
   (b) a polyol.

3. A titanium dioxide pigment according to claim 1 wherein the organophosphate/alkanolamine is the addition product of an organophosphoric acid anhydride and alkanolamine.

4. A titanium dioxide pigment according to claim 3 wherein the alkanolamine component used to form the organophosphate/alkanolamine addition product is a composition selected from the group consisting essentially of dimethylethanolamine, diethylethanolamine, and aminoethylethanolamine.

5. A titanium dioxide pigment according to claim 1 wherein the polyol is a composition selected from the group consisting essentially of trimethylolethane, trimethylolpropane, and pentaerythritol.

6. A titanium dioxide pigment according to claim 1 wherein the organophosphate/alkanolamine addition product and the polyol have each been added in an amount from about 0.01 to about 1.0 weight percent, based upon the weight of the pyrogenic titanium dioxide pigment treated.

7. A titanium dioxide pigment according to claim 1 wherein the organophosphate/alkanolamine addition product and the polyol have each been added in an amount from about 0.1 to about 1.0 weight percent, based upon the weight of the pyrogenic titanium dioxide pigment treated.

8. A titanium dioxide pigment according to claim 1 wherein the organophosphate/alkanolamine addition product and the polyol have each been added in an amount from about 0.4 to about 0.6 weight percent, based upon the weight of the pyrogenic titanium dioxide pigment treated.

9. A method for treating a pyrogenic titanium dioxide pigment according to claim 2 wherein the organophosphate/alkanolamine is the addition product of an organophosphoric acid anhydride and an alkanolamine.

10. A method for treating a pyrogenic titanium dioxide pigment according to claim 9 wherein the alkanolamine component used to form the organophosphate/alkanolamine addition product is a composition selected from the group consisting essentially of dimethylethanolamine, diethylethanolamine, and aminoethylethanolamine.

11. A method for treating a pyrogenic titanium dioxide pigment according to claim 2 wherein the polyol is a composition selected from the group consisting essentially of trimethylolethane, trimethylolpropane, and pentaerythritol.

12. A method for treating a pyrogenic titanium dioxide pigment according to claim 2 wherein the organophosphate/alkanolamine addition product and the polyol have each been added in an amount from about 0.01 to about 1.0 weight percent, based upon the weight of the pyrogenic titanium dioxide pigment treated.

13. A method for treating a pyrogenic titanium dioxide pigment according to claim 2 wherein the organophosphate/alkanolamine addition product and the polyol have each been added in an amount from about 0.1 to about 1.0 weight percent, based upon the weight of the pyrogenic titanium dioxide pigment treated.

14. A method for treating a pyrogenic titanium dioxide pigment according to claim 2 wherein the organophosphate/alkanolamine addition product and the polyol have each been added in an amount from about 0.4 to about 0.6 weight percent, based upon the weight of the pyrogenic titanium dioxide pigment treated.

15. A composition comprising a polymer in admixture with a pyrogenic titanium dioxide pigment which has been treated with an addition system comprising
   (a) an organophosphate/alkanolamine addition product, and
   (b) a polyol.

16. A composition according to claim 15 wherein the polymer is selected from the group consisting essentially of polystyrene, polyethylene and polypropylene.

17. A composition according to claim 15 wherein the organophosphate/alkanolamine component of the addition system with which the pyrogenic titanium dioxide pigment has been treated is the addition product of an organophosphoric acid anhydride and alkanolamine.

18. A composition according to claim 17 wherein the alkanolamine component of the organophosphate/alkanolamine addition product is a composition selected from the group consisting essentially of dimethylethanolamine, diethylethanol amine, and aminoethylethanolamine.

19. A composition according to claim 15 wherein the polyol component of the addition system which has been added to the pyrogenic titanium dioxide pigment is a composition selected from the group consisting essentially of trimethylolethane, trimethylolpropane, and pentaerythritol.

20. A composition according to claim 15 wherein the organophosphate/alkanolamine addition product and the polyol have each been added to pyrogenic titanium dioxide pigment in an amount from about 0.01 to about 1.0 weight percent, based upon the weight of the pyrogenic titanium dioxide pigment.

21. A composition according to claim 15 wherein the organophosphate/alkanolamine addition product and the polyol have each been added to the pyrogenic titanium dioxide pigment in an amount from about 0.1 to about 1.0 weight percent, based upon the weight of the pyrogenic titanium dioxide pigment.

22. A composition according to claim 15 wherein the organophosphate/alkanolamine addition product and the polyol have been added to the pyrogenic titanium dioxide pigment in an amount from about 0.4 to about 0.6 weight percent, based upon the weight of the pyrogenic titanium dioxide pigment.

* * * * *

UNITED STATES PATENT AND TRADEMARK OFFICE
CERTIFICATE OF CORRECTION

PATENT NO. : 4,357,170
DATED : November 2, 1982
INVENTOR(S) : JOHN R. BRAND

It is certified that error appears in the above—identified patent and that said Letters Patent is hereby corrected as shown below:

Column 1, line 42, "in" first occurrence should read -- is --.

Column 3, line 64, "tones" should read -- tone --.

Column 5, line 56, "organc" should read -- organic --.

Signed and Sealed this

Eleventh Day of January 1983

[SEAL]

Attest:

GERALD J. MOSSINGHOFF

Attesting Officer    Commissioner of Patents and Trademarks